BERNARD M. BRENNER
INVENTOR.

BY Robert S. Clay
ATTORNEY

Nov. 5, 1963

B. M. BRENNER 3,109,604

TAPE TENSION SYSTEM

Filed Nov. 7, 1960

5 Sheets-Sheet 2

BERNARD M. BRENNER
INVENTOR.

BY Robert G. Clay
ATTORNEY

Nov. 5, 1963 B. M. BRENNER 3,109,604

TAPE TENSION SYSTEM

Filed Nov. 7, 1960 5 Sheets-Sheet 3

BERNARD M. BRENNER
INVENTOR.

BY Robert G. Clay
ATTORNEY

BERNARD M. BRENNER
INVENTOR

BY Robert S. Clay
ATTORNEY

Nov. 5, 1963 B. M. BRENNER 3,109,604

TAPE TENSION SYSTEM

Filed Nov. 7, 1960 5 Sheets-Sheet 5

BERNARD M. BRENNER
INVENTOR.

BY Robert L. Clay
ATTORNEY

United States Patent Office 3,109,604
Patented Nov. 5, 1963

3,109,604

TAPE TENSION SYSTEM

Bernard M. Brenner, Menlo Park, Calif., assignor to Ampex Corporation, Redwood City, Calif., a corporation of California Filed Nov. 7, 1960, Ser. No. 67,686
11 Claims. (Cl. 242—55.14)

The present invention relates to a tape tension system and in particular to a system for driving supply and take-up reels of a magnetic tape recorder and reproducer to provide balanced tension for the tape on each slide of a tape-driving capstan.

Several tape-tension systems have been employed in various types of magnetic recorders and have, generally, been successful in the particular use for which the equipment was designed. For example, in inexpensive home recorders torque motors having constant excitation are used to provide tape tension inversely proportional to the diameter of the tape on the reels. Also, in more expensive recorders more elaborate systems are used and usually include a constant-tension servo loop operating from either swinging-arm sensors at the reels or pressure sensors within vacuum columns carrying loops of tape.

For the high degree of accuracy required of instrumentation types of recorders and reproducers the foregoing tape-tension systems have inherent disadvantages that introduce errors and thereby render the systems unacceptable. In the first example set forth above a nonuniform tape pack results, flutter is increased at small pack diameters because of higher tape tension, and interchangeability of tapes between machines depends upon uniformity of motor characteristics. The closed loop servo systems of the second example are subject to oscillation and may be sensitive to errors in adjustment and changes in the parameters of elements. Also, in some examples the full amount of mechanical power to the reel is supplied eventually by a control amplifier, which is large to supply high power, and, if a magnetic amplifier, slow in response.

It is therefore an object of the present invention to provided a new and improved balanced tape tension system for a magnetic recorder and reproducer.

Another object of the invention is to provide a system for driving and controlling tape reels of a magnetic recorder and reproducer whereby the tape tension is maintained in balance on both sides of the driving capstan regardless of the speed of the tape or the diameter of the pack on the reels.

A further object of the invention is to provide an optical sensor of the amount of tape on the individual reels that does not contact the tape and does not interfere with the tape loading or threading.

A still further object of the invention is to provide an optical sensor of the amount of tape on the individual reels that is self-compensating for changes in illumination intensity.

Another important object of the invention is to provide a lower-power control for the reel driving motor in maintaining the tape tension constant.

In brief, the present invention comprises optical sensors for developing signals proportional to the amount of tape on each of the reels to separately control magnetic clutches coupled between respective motors and turntables for the reels and maintain a balanced tape tension condition for any tape speed or pack diameter. The optical sensors provide an accurate indication of the pack diameter of the tape on the respective reels independent of variations in the ambient light or light source intensity.

Other objects and advantages of the invention will be apparent from the following description and claims considered together with the accompanying drawings, in which:

Figure 1:
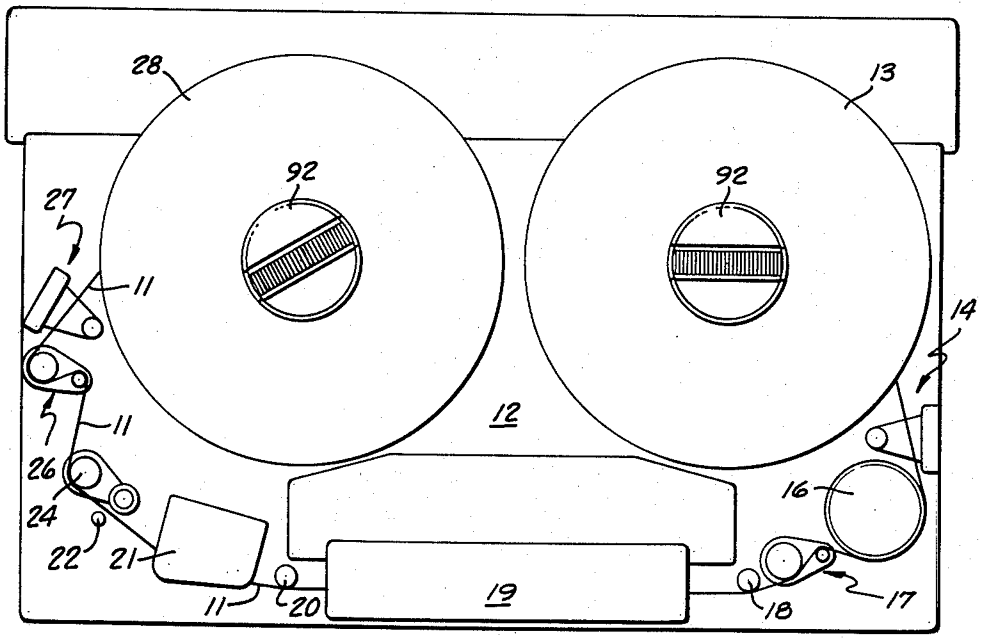
FIGURE 1 is a view illustrating the arrangement of the tape handling components of a magnetic tape recorder and reproducer with which the present invention may be used.

Referring now to the drawings in detail, FIGURE 1 in particular, the components for a system of handling a magnetic tape 11 are shown as arranged on a panel 12 of one type of a magnetic recorder and reproducer with which the invention may be used. Thus, from a supply reel 13 the tape 11 is extended through a first photocell assembly 14 to engage a heated tape guide 16 and from such guide about a slack takeup idler and rotary guide combination 17. The tape 11 is then threaded across a fixed guide 18 and through a wideband head assembly 19, which may have a plurality of magnetic heads mounted on one or more rotating drums (not detailed) for recording or reproducing signal information along tracks extended transversely across the width of the tape. Next, the tape 11 is threaded across a fixed guide 20 and then through an auxiliary head assembly 21, where control tracks and other signal information may be recorded longitudinally along the edges of the tape. From the auxiliary head assembly 21 the tape 11 is extended between a capstan 22 and a pinch roller 23 for driving the tape to engage a rotary guide 24 and thence about another slack takeup idler and rotary guide combination 26. Finally, the tape 11 is extended through a second photocell assembly 27 and onto a takeup reel assembly 28.

The tape handling components, just described in reference to FIGURE 1, transport the tape 11 from the supply reel 13, over the magnetic heads of the assemblies 19 and 21, to the takeup reel 28. To control the speed of the tape 11 through the head assemblies 19 and 21, which speed must be accurately controlled for proper operation, the capstan 22 is driven by a constant speed motor (not shown) during the record or reproduce mode of operation. The pinch roller 23 is controlled to clamp the tape 11 to the capstan 22 whenever the tape is to be driven. When the tape 11 is played back in the reproduce mode of operation on the same, or a different machine, the speed at which the record mode was accomplished is accurately duplicated by servo control (not shown) of the reproducer capstan speed.

To prevent mishandling of the tape 11 in any mode of operation resulting in loops of tape being thrown or the tape being damaged, the supply and takeup reels 13 and 28, respectively, are driven separately in a controlled manner. The mechanical drive for each of the supply and takeup reels is substantially the same structurally, therefore, only one (the supply reel drive) will be described in detail. Thus, an annular housing 31 is provided that has a flange 32 extended about an opening 33 in the panel 12, with suitable screws 34 securing the flange to the panel. Below the panel 12, but offset from the center of the housing 31, an alternating current motor 36 is suitably mounted, as by screws 37, transversely on a motor bracket 38. Such motor bracket 38 is mounted parallel to the panel 12 and is suitably secured, as by screws 39, to an extended portion 41 of the housing 31. The drive shaft 42 of the motor 36 is extended through an opening 43 in the bracket 38 and a pulley 44 is secured to the shaft, as by a set screw 46.

Also mounted off center within the housing 31 below the panel 12 is a hysteresis clutch 51 having an input shaft 52 extending through an opening 53 in the motor bracket 38 with a pulley 54 suitably mounted thereon, as by a set screw 56, in alignment with the motor pulley 44. A drive belt 58 is extended about both pulleys 44 and 54 and, to provide a speed reduction therebetween, the diameter of the motor pulley 44 is substantially less than the diameter of the clutch pulley 54. An output shaft 61 of the clutch 51 is oppositely extended through a bearing 62 of the housing 31, in alignment with the input shaft 52, and is provided with a gear 63 suitably secured thereto, as by a rollpin 64.

Within a central hub 66 of the housing 31, as extended above the panel 12, is a spindle or shaft 67 suitably secured by set screws 68 extending through the hub and engaging a groove 69 of the shaft. An annular turntable 71 has a central opening 72 through a hub portion 73 providing clearance with respect to the hub 66 and a table portion 74 extended in alignment with the upper surface of the flange 32. A lower ball bearing 76 is disposed within the opening 72 between the shaft 67 and the hub portion 73 of the turntable 71. To retain the lower bearing 76 in position and support the turntable 71, an inner retaining ring 77 is suitably mounted on the shaft 67 to rest on the upper surface of the hub 66 and provide a shoulder upon which the inner race of the bearing is supported. Also, an outer retaining ring 78 is suitably mounted in the wall of the opening 72, in the same plane as the inner retaining ring 77, to provide a shoulder for support of the outer race of lower bearing 76. Spaced from the lower bearing 76 by a sleeve spacer 81 mounted on the shaft 67 is a similar upper bearing 82 maintained in position between the spacer and a combination of inner and outer retaining rings 83 and 84, similar to those described for the lower bearing.

In accordance with the foregoing structure the turntable 71 is freely rotatable about the fixed shaft 67. To drive the turntable 71 in a controlled manner an annular spur gear 86 is mounted, as by screws 87, on the turntable to mesh with the clutch gear 63. A second degree of speed reduction is introduced between the motor 36 and the turntable 71, by providing the clutch gear 63 with a lesser diameter than that of the turntable spur gear 86.

Figure 2:
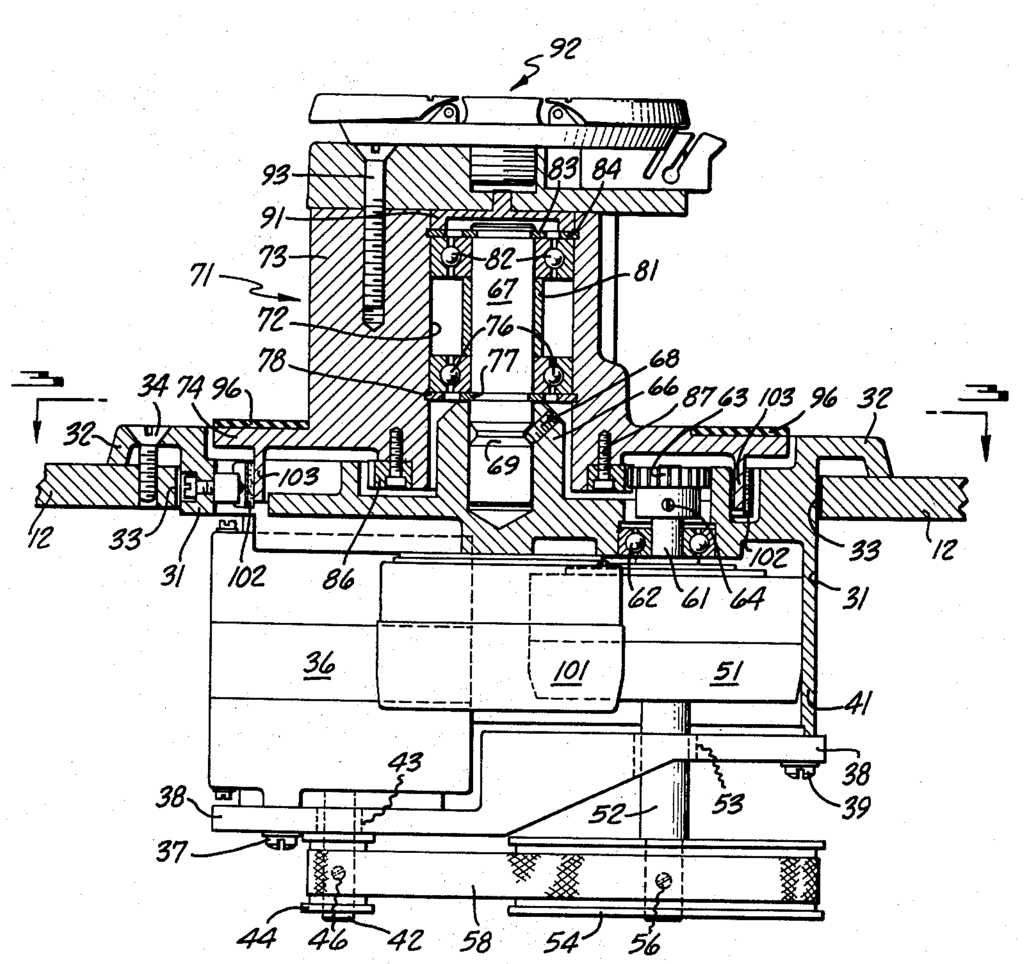
FIGURE 2 is an elevation view, partly in section, of a reel drive for one of the reels of FIGURE 1.

As illustrated in FIGURE 2, an adapter 91 is mounted within the opening 72 of the turntable 71 and is supported by the outer retaining ring 84 of the upper bearing 82. The adapter 91 permits the concentric mounting of a conventional precision, reel hold-down knob assembly 92, as by screws 93, on the hub portion 73 of the turntable 71. An annular washer 96 is mounted, as by a suitable glue, on the upper surface of the flange portion 74 of the turntable 71 to space the reel 13 above the flange 32.

Figure 3:
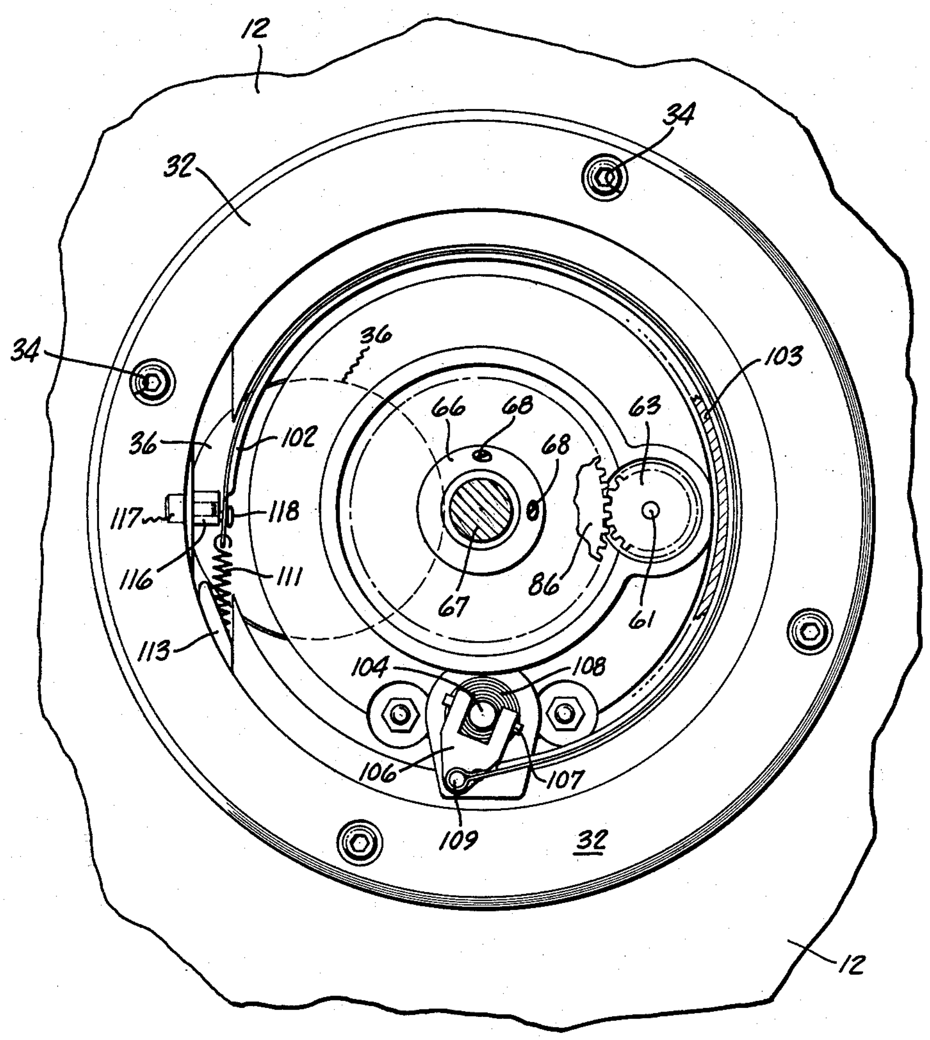
FIGURE 3 is a plan view of the reel drive of FIGURE 2 with the turntable removed.
Figure 4:
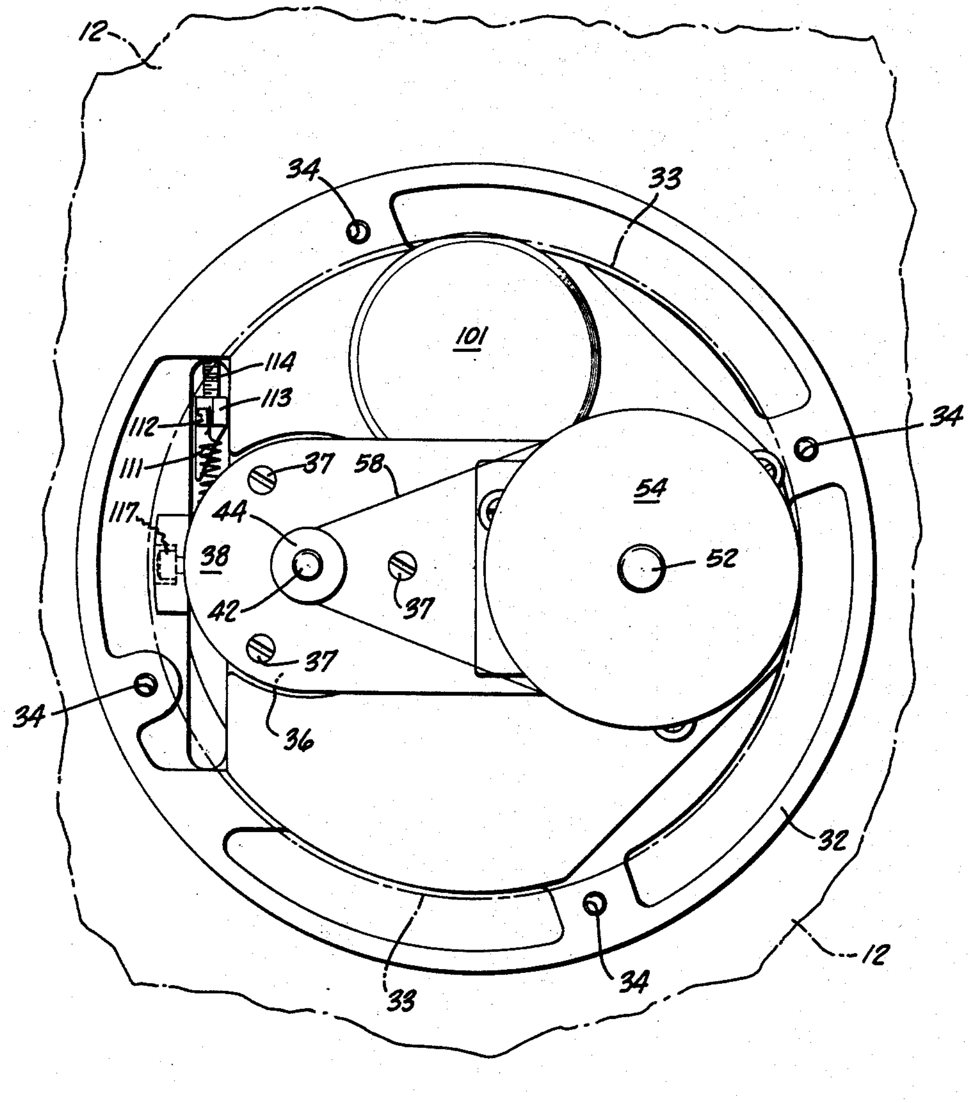
FIGURE 4 is a bottom view of the reel drive of FIGURE 2.

To stop rotation of the turntable 71 a brake solenoid 101, of the rotary type, is mounted within the housing 31 below the level of the panel 12 to tighten a brakeband 102 about a drum 103 formed as a downward extension of the turntable. Now, as shown in the plan view of FIGURE 3 with the turntable 71 removed, the brake solenoid 101 has a rotatable shaft 104 with an actuator arm 106 secured thereto as by pin 107. When the brake solenoid 101 is not energized, a strong spiral spring 108, conventionally coupled to the shaft 104, returns the shaft from the energized position of rotation. One end of the brake band 102 is hooked about a post 109 extended transversely from the arm 106 and the other end is hooked to a spring 111. The spring 111 is, in turn, secured by a screw 112 to a spring bracket 113 that is mounted within the housing 31 by a screw 114 (see FIGURE 4). The brakeband 102 is readily adjustable by means of the screw 114. Also, a brake stop 116 is secured by a screw 117 to the housing 31 near the spring end of the brakeband 102. Such brake stop 116 is provided with an L-shaped projection 118 spanning one edge of the brakeband 102 to bear against the innermost side thereof and limit the maximum braking action. Thus, the position of the screw 117 provides another adjustment for the brake band 102.

To sense the amount of tape 11 on the respective supply and takeup reels 13 and 28, the photocell assemblies 14 and 22 are provided as illustrated in FIGURE 1. Both of such photocell assemblies 14 and 22 are the same and only one, that for the supply reel 13, will be described in detail. Referring now to the plan view of the photocell assembly 14 of FIGURE 6, there is shown a lamp housing 121 and a photocell housing 122 as supported on a base 123 to extend in parallel and spaced-apart relation. The base 123 is provided with apertures 124 to mate with similar apertures (not shown) in the panel 12 so that the assembly 14 may be mounted in proper position on the panel by screws.

Figure 6:
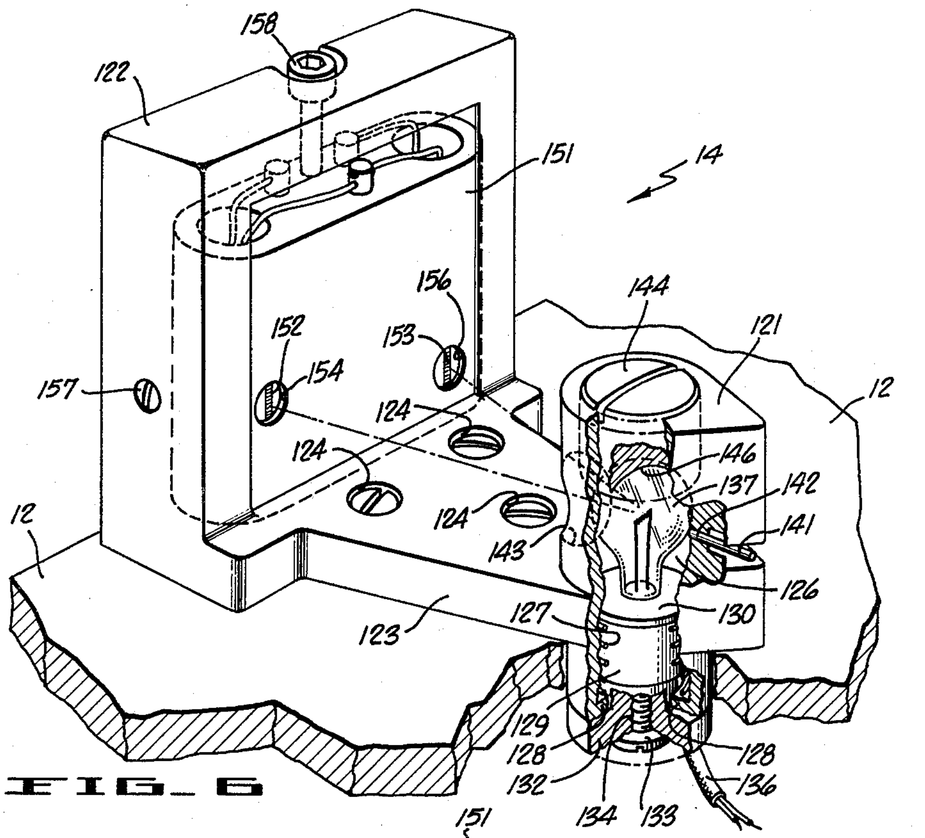
FIGURE 6 is a perspective view of the photocell assembly of FIGURE 5.

The lamp housing 121 is provided with a central bore 126 extending longitudinally therethrough (see FIGURE 6). A helical compression spring 127 is disposed within the bore 126 to rest upon a shoulder 128 at the lowermost portion of the bore. Within the spring 127 is a lamp holder 129 having a flange 130 supported by the uppermost portion of the spring. A lamp guide 132 engages the lower portion of the lamp housing 121 with a screw 133 extended through a central opening 134 to threadably engage the lamp holder 129. Openings (not shown) are also provided through the lamp guide 132 for electrical leads 136 from the lamp holder 129. A lamp 137 is mounted within the lamp holder 129 and is continuously energized during operation from a source (see FIGURE 7) connected to the leads 136. Such lamp 137 may serve as a point source of light or, as shown in FIGURE 6, a line source with the filament thereof extended parallel to both the photocell housing 122 and the base 123, as well as parallel to the lower elongated edge of the tape 11.

A visual indication that the filament of lamp 137 is adjusted to the proper height is provided by a light tube 141 extended through an opening 142 in the lamp housing 121. To project light from the lamp 137 toward the photocell assembly 122 there is provided a window 143 through the lamp housing 121. A setscrew 144 is threadably mounted in the uppermost portion of the bore 126 and is provided with a concave face 146 bearing against the lamp 137. Thus, by adjustment of the setscrew 144 the lamp 137 is suitably positioned to provide illumination through the window 143 as a line source of light. Also, the lamp 137 is readily changed by removing the setscrew 144.

Within the photocell housing 122 a photocell assembly 151 is mounted, which assembly includes two parallel-mounted units 152 and 153 with one unit 152 having the photocell thereof (not shown) disposed at a higher level than that of the other unit 153. Two windows 154 and 156 respectively communicate with the cells of the units 152 and 153. Photocell assembly 151 may be adjusted in height within the photocell housing 122 by screw 158, and secured as by setscrew 157. Suitable openings (not shown) are provided in the base of the housing for electrical connections, which will be discussed more fully hereinafter along with the operation.

Figure 7:
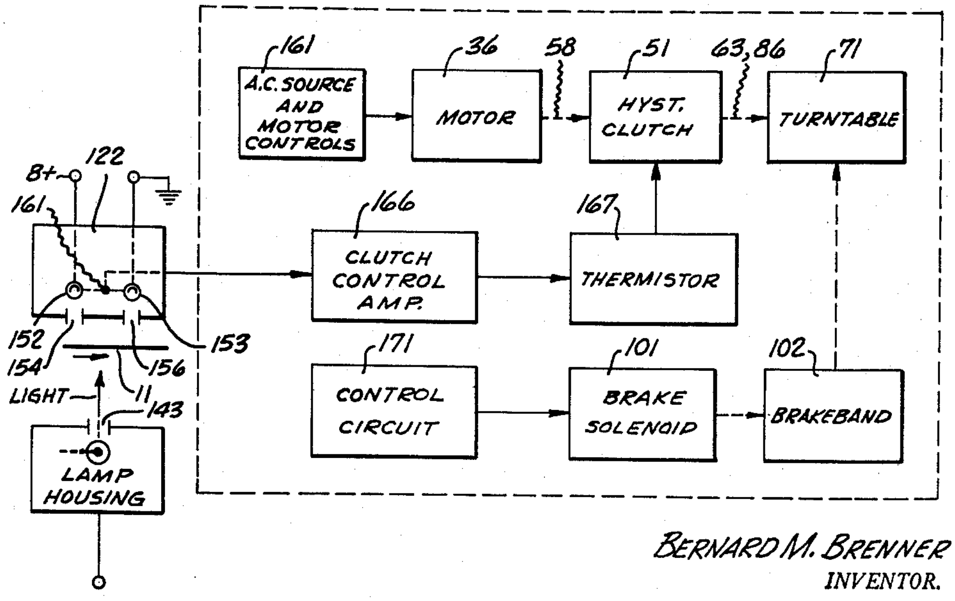
FIGURE 7 is a schematic block diagram of the present invention.

Referring now to the schematic block diagram of FIGURE 7, the relationship between the principal elements of the invention, both electrical and mechanical, is shown. It is seen that a source 161 is connected to the motor 36 and such source may be a three-phase, 400 cycles per second, alternating current supply with the motor 36 being of the induction type. The motor 36 is coupled to the hysteresis clutch 51 through the belt 58 and the clutch, in turn, is coupled to the turntable 71 through gears 63 and 86. When maximum current flows to the winding (not shown) of the hysteresis clutch 51, the turntable 71 is driven at maximum torque. With no current flowing through the hysteresis clutch 51, the turntable 71 is completely decoupled from the motor 36. Intermediate values of current through the clutch 51 result in intermediate coupling between the turntable 71 and the motor 36 and, thereby, intermediate values of torque to the turntable. With such arrangement the torque delivered through the clutch 51 is independent of speed and the speed of the turntable 71 is determined solely by the capstan speed and the diameter of the tape pack.

In accordance with the invention, mishandling of the tape 11 in any mode of operation, resulting in loops being thrown or the tape being damaged, is prevented by separately driving the respective turntables 71 of the supply and takeup reels 13 and 28 through the respective hysteresis clutches 51. The current flow through the clutches 51 is normally controlled in relation to the pack radius of tape 11 on the respective supply and takeup reels 13 and 28, providing constant tape tension. However, to provide for rapid completion of the rewind mode of operation maximum current is supplied to the clutch of the supply reel 13, and for rapid completion of the fast forward mode of operation maximum current is supplied to the clutch of the takeup reel 28.

To provide the proportional control of clutch current previously described, the photocell assemblies 14 and 27 are respectively mounted adjacent to the supply and takeup reels 13 and 28 to individually sense the amount of tape on the reels. The tape 11 then extends from the supply reel 13 through the photocell assembly 14 to the guide 16. The U-shaped form of the photocell assembly 14 does not interfere with threading of the tape 11 as there is no contact therebetween. With the tape 11 so extended, the photocell of the assembly 152 is selectively shaded by the position of the tape between the window 154 and the light projecting through the opening 143 from the lamp 137. The photocell of the other assembly 153 is illuminated through the window 156 by the lamp 137 at all times. Thus, by connecting the photocells of the two assemblies 152 and 153 in series, with the shaded cell 152 connected to a source of electrical energy, indicated by B+ in FIGURE 7, and the other cell 153 connected to ground, the potential between the midpoint and ground is unaffected by ambient light and by variations in elemental characteristics of the lamp because of aging.

Figure 8:
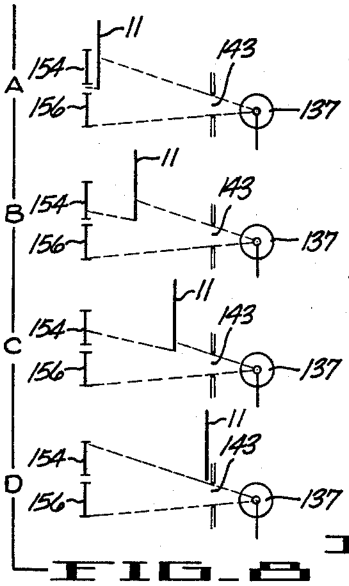
FIGURE 8 is a series of schematic illustrations showing the operation of the photocell assembly of FIGURE 5.
Figure 5:
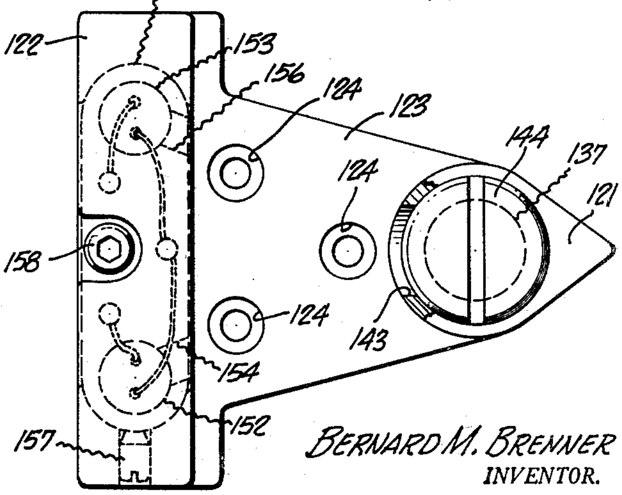
FIGURE 5 is a plan view of one of the photocell assemblies of FIGURE 1.

Referring now to the series of diagrams of FIGURE 8, the manner in which light projects between the windows 154 and 156 of the photocell assemblies 152 and 153, respectively, and the opening 143 of the lamp assembly or housing 121 is shown in simplified form with the tape 11 positioned according to the diameter of various packs of tape. Thus, in FIGURE 8A the reel 13 is substantially full and the tape 11 extends substantially parallel to and closely adjacent to the photocell housing 122 to almost completely shade the window 154. Minimum light then reaches the photocell of the assembly 152 from the lamp 137. As the pack of tape 11 decreases on the reel 13 the tape moves toward the lamp housing 121, as shown in FIGURES 8B and 8C, so that less shading of the window 154 occurs and the intensity of light incident on the window increases. When the reel 13 is substantially free of the tape 11, the shading of the window 154 is at a minimum and a maximum intensity of light reaches the photocell of the assembly 152.

As stated previously, the photocells of the two assemblies 152 and 153 are connected in series between a source of potential and ground. The photocell of the assembly 153, which is continuously illuminated, is connected to the source B+ and the other to ground. With such connections the potential from the junction 161 between the two photocells to ground is a function of the position of the tape 11 as it comes off of the supply reel 13 and, therefore, is a function of the diameter of the tape pack, which function is not altered by ambient light conditions or changes in the characteristics of the various elements. It should be noted that these photocells have a negative coefficient of resistance with increasing illumination.

The potential at the junction 161 is applied to a clutch control power amplifier 166 which provides a maximum output current for a minimum input potential, and through a thermistor 167 to the hysteresis clutch 51. The thermistor 167 provides temperature compensation for the copper winding (not shown) of the hysteresis clutch 51. Thus, as the amount of tape 11 on the reel 13 decreases, the potential at the junction 161 increases to provide decreasing current through the hysteresis clutch 51 so that less coupling exists between the motor 36 and turntable 71. The result of less coupling between the motor 36 and the turntable 71 is a decrease in the torque applied to the turntable and, therefore, to the supply reel 13. The torque is decreased in proportion to the decrease in pack radius, so that tape tension remains substantially constant.

As the tape 11 is being withdrawn from the supply reel 13 by the action of the capstan 22 a similar amount of tape is being added to the takeup reel 28. It will, therefore, be apparent that the respective hysteresis clutches 51 of the two reels 13 and 28 are energized in opposite senses; that is, the current to one is decreasing and that to the other increasing. In such respect, then, the pull on the tape 11 applied by one motor 36 and clutch 51 to the associated turntable 71 for the supply reel 13 is equalled by the pull exerted on the tape by the motor 36 and clutch 51 associated with the turntable 71 for the takeup reel 28. The tape 11 is held in a state of balance with equal tension being applied from each reel 13, 28 and the tape is free to move under the pull exerted by the capstan 22. It is to be noted that the tape 11 is transported only by the action of the capstan 22.

Referring now to the operation of the combination of the brake solenoid 101 and brakeband 102, the structural relationship of which, with respect to the turntable 71, was previously described, there is provided a control circuit 171 responsive to manual controls (not shown) establishing various modes of operation for setting the brake. While the control circuit 171 is shown as connected only to the brake solenoid 101 of the turntable 71 for the supply reel 13, it is to be realized that a similar connection is also made to the turntable for the takeup reel 28 with different operational results as set forth hereinafter. The modes of operation include (1) record, (2) reproduce, (3) fast forward, and (4) rewind. In the standby or "off" condition with power connected to the system the brake solenoid 101 is de-energized and the brakeband 102 is applied to the drum 103 of the turntable 71.

In general, the brakebands 102 of the respective turntables 71 for the supply and takeup reels 13 and 28 operate in a differential manner so that the braking action is greater in one direction of turntable rotation than in the other. For the turntable 71 of the supply reel 13 the brakeband 102 is arranged for restraining clockwise rotation more than counterclockwise rotation. Conversely, for the turntable 71 of the takeup reel 28, the brakeband 102 is arranged for restraining counterclockwise rotation more than clockwise rotation. For stopping tape motion, pinch roller 23 is disengaged, and both brakebands 102 of the respective turntables 71 are actuated by simultaneous de-energizing of solenoids 101.

During the record, reproduce, and fast forward modes of operation, the tape 11 is transported in the same direction from the supply reel 13 to the takeup reel 28. Should the stop switch (not shown) be pressed during such modes the brake solenoid is de-energized through the control circuit 171 and the brakeband 102 is applied to the drum 103 of the supply reel turntable 71 of maximum braking. It is necessary in such modes of operation that the supply reel 13 be stopped in a minimum amount of time because, should the supply reel run on after the demand for the tape 11 has started to fall, the supply reel will overrun the takeup reel 28 and loops of tape will be thrown. As stated previously, the brakeband 102 of the takeup reel turntable 71 is applied simultaneously and the differential braking action is opposite to that of the supply reel 13, so that less than maximum braking occurs at the turntable takeup reel 71 in the instance under consideration; however, it is to be noted that the braking action at the supply reel results in a pull on the tape 11 and such pull is exerted so that both reels come to a standstill with the tape under tension. Since there is a positive braking action at the takeup reel 28 in the counterclockwise direction of rotation, such reel cannot then backup to cause loops of tape 11 to be formed and the motor 36 of the reel is running to takeup any tape slack, which may occur for any reason.

During the rewind mode of operation the supply reel 13 is being driven to takeup tape 11 and the takeup reel 28 is being driven to supply hold-back tension. The differential braking action of the two reels 13 and 28 provides the same operation as set forth in the foregoing to prevent mishandling of the tape 11 during the transport of tape in the reverse direction. It is to be noted that when the brake solenoid 101 of the two turntables 71 is not energized, the brakebands 102 are in engagement with the respective brake drums 103 to provide a fail-safe condition under no-voltage situations.

In addition to the foregoing braking action during the fast forward and rewind modes of operation, it should be noted that in such modes the hysteresis clutches 51 are energized to complete the modes as rapidly as possible. Thus, a fixed maximum current is caused to flow through the clutch 51 of the supply reel 13 in the rewind mode and through the clutch 51 of the takeup reel 28 in the fast forward mode. The circuit connections for accomplishing such operation are not illustrated, but are readily made through the conventional control switches of the recorder and reproducer.

There has been described in the foregoing a system for maintaining a balanced tension on the magnetic tape 11 on either side of the capstan 22 as extended for transport between supply and takeup reels 13 and 28. In summary, the mechanical power train is characterized in that the motor 36 provides low torque and high speed, the hysteresis clutch 51 provides medium torque and medium speed, and the reel turntable 71 is finally driven at high torque and low speed. With such a power train, where the motor 36 has an output of $\frac{1}{25}$ horsepower (about 30 watts), the entire output thereof is controlled by a maximum power of 5 watts into the hysteresis clutch 51. It is, therefore, apparent that the output requirement of the clutch control amplifier 166 is such that a large and expensive amplifier is not required. The input to the respective clutch control amplifier 166, as derived from the photocell assemblies 14 and 27, is an accurate representation of the amount of tape 11 on the respective reels 13 and 28 so that the torques delivered to the reels are proportional to their pack radii to maintain a balanced tension on the tape under all conditions. It is to be noted that in the foregoing where the signals are developed proportional to the diameter of the tape pack on the reels 13, 28 a nonuniform tape pack may result. The tape pack may then be improved by conventionally introducing a functional relationship within the hysteresis clutch control amplifier 166 so that the torque applied to the turntable 71 has a functional relationship to the tape pack, other than the proportional relationship.

While the salient features of the present invention have been set forth in detail with respect to a single embodiment, it will be readily apparent that numerous modifications and changes may be made within the spirit and scope of the invention and it is therefore not deisred to limit the invention to the exact details shown and described, except insofar as they may be defined in the following claims.

What is claimed is:

1. A drive system for a reel of tape comprising: a motor having a drive shaft; means for energizing the motor to rotate the drive shaft; a rotatable turntable having a reel for tape mounted thereon; a hysteresis clutch having an input shaft and an output shaft; first speed reduction means for coupling the drive shaft to the clutch input shaft; second speed reduction means for coupling the clutch output shaft to the turntable; a guide member engaging and guiding said tape to and from said reel; photoelectric means for sensing the lateral displacement of said guided tape and for developing a signal that is a continuous function of the amount of tape on said reel; and means for applying the signal to the clutch for controlling the torque applied to the turntable by the motor.

2. A drive system for a reel of tape comprising: an induction motor having a drive shaft; means for energizing the motor to rotate the drive shaft; a rotatable turntable having a reel for tape mounted thereon; a hysteresis clutch having an input shaft and an output shaft; first speed reduction means for coupling the drive shaft to the clutch input shaft; second speed reduction means for coupling the clutch output shaft to the turntable; a guide member engaging and guiding said tape to and from said reel; photoelectric means for sensing the lateral displacement of said guided tape and for developing a signal that is a continuous function of the amount of tape on said reel; and a power amplifier coupled between the photoelectric means and the clutch for developing a maximum output current for a minimum input signal and for controlling the torque applied to the turntable by the motor in accordance with the diameter of the tape pack.

3. A drive system for a reel of tape comprising: an induction motor having a drive shaft; a first pulley mounted on the drive shaft; means for energizing the motor to rotate the drive shaft and first pulley; a hysteresis clutch having an input shaft and an output shaft; a second pulley mounted on the input shaft of the clutch with the diameter being greater than that of the first pulley; a drive belt disposed about the first and second pulleys; a rotatable turntable with a reel for tape mounted thereon for rotation therewith, the turntable having a spur gear engaging a gear mounted on the output shaft of the clutch with the spur gear having a greater diameter than the clutch gear; a photoelectric assembly for sensing the diameter of tape pack on the reel and developing a continuously proportional signal; and a power amplifier coupled between the assembly and the clutch for developing a maximum output current for a minimum input signal and for controlling the torque between the motor and turntable.

4. A drive system for a reel of tape comprising: an annular housing; an induction motor mounted off-center within the housing and having a drive shaft; a first pulley mounted on the drive shaft; means for energizing the motor to rotate the drive shaft and first pulley; a hysteresis clutch mounted off-center within the housing and having an input shaft and an output shaft; a second pulley mounted on the input shaft of the clutch and a first gear mounted on the output shaft thereof; a drive belt disposed about the first and second pulleys with the second pulley having a larger diameter than the first pulley; a rotatable turntable with a reel for tape mounted on a spindle extended from the housing and having a second gear engaging the first gear within the housing, the diameter of the second gear being greater than the diameter of the first gear; a photoelectric assembly including photocell means and light means in spaced relation for sensing the diameter of tape pack on the reel in response to the instantaneous position of the tape as extended between the photocell and light means; and a power amplifier coupled between the photocell means and the hysteresis clutch for developing a maximum output current for a minimum input signal and for controlling the torque applied by the motor to the turntable in accordance with the amount of tape on the reel.

5. A photoelectric assembly for sensing the amount of tape on a reel comprising: a source of light; photocell means spaced from the source of light and including a first photocell disposed in alignment with the source of light and a second photocell disposed above the first photocell, the first and second photocells being connected in a series-circuit arrangement across a source of electrical energy; and means for fixing the position of an extended portion of the tape as transported to and from the reel with the tape variably shading the second photocell in accordance with the diameter of the pack of tape on the reel to develop a signal across the second photocell continuously proportional to the intensity of incident light and thereby proportional to the instantaneous diameter of tape on the reel independent of variations in ambient light and the source of light.

6. In a magnetic tape recorder and reproducer having a magnetic head assembly across which tape is transported by a capstan between supply and takeup reels, the combination comprising: first and second induction motors; first and second hysteresis clutches respectively coupled between the first and second motors and the supply and takeup reels; a first guide member engaging and guiding said tape from said supply reel; a first photocell assembly mounted adjacent to the supply reel for sensing the lateral displacement of said guided tape and for developing a first signal that is a continuous function of the amount of tape on said supply reel; a first clutch control amplifier coupled to said first photocell assembly for applying maximum current to the first hysteresis clutch in response to a minimum value of said first signal; a second guide member engaging and guiding said tape to said takeup reel; a second photocell assembly mounted adjacent to the takeup reel for sensing the lateral displacement of said last-named guided tape and for developing a second signal that is a continuous function of the amount of tape on said takeup reel; and a second clutch control amplifier coupled to said second photocell assembly for applying maximum current to the second hysteresis clutch in response to a minimum value of said second signal whereby the torques applied to the respective reels are controlled to provide a balanced tape tension on each side of the capstan.

7. A drive system for a reel having a pack of tape coiled thereon comprising: a motor having a drive shaft; means for energizing the motor to rotate the drive shaft; a rotatable turntable having said reel mounted thereon with the outer end of said tape extending tangentially from the periphery of said pack; variable means for coupling the drive shaft to the turntable; a tape guide member spaced from said reel and engaging said outer end of tape to define a segment of tape between said guide member and said pack; photoelectric means mounted between said guide member and said pack for sensing the lateral displacement of said tape segment and for developing a signal that is a continuous function of the amount of tape on said reel; and means for applying the signal to the variable means for controlling the torque applied to the turntable by the motor.

8. A drive system for a reel having a pack of tape coiled thereon comprising: an induction motor having a drive shaft; means for energizing the motor to rotate the drive shaft; a rotatable turntable having said reel mounted thereon with the outer end portion of said tape extending tangentially from the periphery of said pack; variable electromagnetic means for coupling the drive shaft to the turntable; a tape guide member spaced from said reel and engaging said outer end portion of tape to define a segment of tape between said guide member and said pack; photoelectric means mounted between said guide member and said pack for sensing the lateral displacement of said tape segment and for developing a signal that is a continuous function of the amount of tape on said reel; and means for applying the signal to the variable electromagnetic means for controlling the torque applied to the turntable by the motor.

9. A drive system for a reel having a pack of tape coiled thereon comprising: an induction motor having a drive shaft; means for energizing the motor to rotate the drive shaft; a rotatable turntable having said reel mounted thereon with the outer end portion of said tape extending tangentially from the periphery of said pack; a hysteresis clutch for coupling the drive shaft to the turntable; a tape guide member spaced from said reel and engaging said outer end portion of tape to define a segment of tape between said guide member and said pack; photoelectric means mounted between said guide member and said pack for sensing the lateral displacement of said tape segment and for developing a signal that is a continuous function of the amount of tape on said reel; and means for applying the signal to the hysteresis clutch for controlling the torque applied to the turntable by the motor.

10. A photoelectric assembly for sensing the amount of tape in a tape pack coiled on a reel of the class wherein the outer end portion of said tape extends tangentially from the periphery of said pack, and a tape guide member is mounted in spaced relation to said reel and engages said outer end portion of tape to define a segment of tape between said guide member and said pack, said photoelectric assembly comprising: a source of light and photocell means mounted between said guide member and said pack in spaced-apart relation on opposite sides of said segment of tape; and electrical energy means connected in circuit arrangement with the photocell means for developing a signal continuously proportional to the intensity of light passing the tape segment, dependent upon the instantaneous position of the tape segment as determined by the diameter of said tape pack on said reel.

11. In a magnetic tape recorder and reproducer having a magnetic head assembly across which tape is transported by a capstan between supply and takeup reels, the combination comprising: a separate drive system coupled to each of the supply and takeup reels including a variable electromagnetic means for establishing the torque delivered to the respective reels; separate means for sensing the diameters of the tape packs on the respective reels, each of said last-named means including a tape guide member spaced from the respective reel and engaging the portion of tape extending tangentially from the respective tape pack so as to define a segment of tape between said guide member and the respective pack, and photoelectric means mounted between said guide member and said pack for sensing the lateral displacement of said tape segment and for developing a signal that is a continuous function of the amount of tape on said respective reel; separate means for receiving the respective signals and developing maximum output current in response to minimum signals; and separate means for coupling the output currents to control the electromagnetic means of the respective drive system whereby the torques applied to the respective reels are controlled to provide a balanced tape tension on each side of the capstan.

References Cited in the file of this patent

UNITED STATES PATENTS

| | | |
|---|---|---|
| Re. 22,240 | Kline | Dec. 29, 1942 |
| 2,283,121 | Michel | May 12, 1942 |
| 2,365,691 | Fodor | Dec. 26, 1944 |
| 2,746,691 | Hoad | May 22, 1956 |
| 2,855,160 | Fundingsland | Oct. 7, 1958 |
| 2,928,953 | Bassler | Mar. 15, 1960 |
| 2,944,156 | Davy et al. | July 5, 1960 |